(12) United States Patent
Jung et al.

(10) Patent No.: US 8,554,059 B2
(45) Date of Patent: Oct. 8, 2013

(54) BROADCAST SIGNAL PROCESSING SYSTEM AND METHOD FOR SEARCHING STORAGE DEVICE THEREOF

(75) Inventors: Kyong Jo Jung, Gyeonggi-do (KR); Sang Yong Lim, Gyeonggi-do (KR); Ho Jae Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 957 days.

(21) Appl. No.: 12/398,647

(22) Filed: Mar. 5, 2009

(65) Prior Publication Data
US 2009/0226146 A1 Sep. 10, 2009

(30) Foreign Application Priority Data
Mar. 5, 2008 (KR) .......................... 10-2008-0020624

(51) Int. Cl.
*H04N 5/76* (2006.01)
(52) U.S. Cl.
USPC .......................................................... 386/299
(58) Field of Classification Search
USPC ............................................................ 386/299
See application file for complete search history.

(56) References Cited

U.S. PATENT DOCUMENTS

| | | | |
|---|---|---|---|
| 6,801,507 B1 | 10/2004 | Humpleman et al. | |
| 7,246,180 B1* | 7/2007 | Yoshida et al. | 710/15 |
| 2003/0110237 A1* | 6/2003 | Kitamura et al. | 709/219 |
| 2005/0125569 A1 | 6/2005 | Swidler et al. | |
| 2006/0093325 A1 | 5/2006 | Imai et al. | |
| 2006/0123459 A1 | 6/2006 | Watanabe | |
| 2006/0136383 A1 | 6/2006 | Golla | |
| 2009/0102983 A1* | 4/2009 | Malone et al. | 348/734 |

* cited by examiner

*Primary Examiner* — Kambiz Zand
*Assistant Examiner* — Ali Shayanfar
(74) *Attorney, Agent, or Firm* — Birch, Stewart, Kolasch & Birch, LLP

(57) ABSTRACT

The present invention relates to a broadcast signal processing system and a method for searching a storage device thereof. One of the embodiments of the present invention includes a receiving unit configured to receive a broadcast signal, a decoding unit configured to decode the broadcast signal received by the receiver, a display unit configured to display broadcast content according to the broadcast signal decoded by the decoder, an interface unit configured to communicate with the storage device through a wired network or a wireless network, and a control unit configured to control access to the storage device through the interface unit using one of connection information as to the storage device connected by the interface unit and search information as to the storage device searched through the network by the interface unit, and to control storage of the broadcast signal decoded by the decoder in the storage device or playback of content stored in the storage device by the display unit.

13 Claims, 7 Drawing Sheets

(a)

(b)

BROADCAST SIGNAL PROCESSING SYSTEM AND METHOD FOR SEARCHING STORAGE DEVICE THEREOF

This application claims the priority benefit of Korean Application No. 10-2008-0020624, filed on Mar. 5, 2008, which is hereby incorporated by reference as if fully set forth therein.

BACKGROUND OF THE INVENTION

1. Field of the Invention

The present invention relates to a broadcast signal processing system and a method for searching a storage device thereof.

2. Discussion of the Related Art

One of digital TV application services, which are increasingly popular, is providing an additional convenience function to viewers by equipping a broadcast receiver with a storage medium, for example, a hard disk drive (HDD).

A broadcast stream stored in the HDD can support a variety of trick playback modes, such as slow, fast forward, reverse playback, etc., in addition to a normal speed playback. For such trick playback modes, features of a video stream contained in each transport stream (TS) are extracted and related index data is constructed and stored together with the features of the video stream, when storing the broadcast stream. When playing the broadcast stream, various trick playback modes can be performed with reference to the stored data according to viewer demand.

However, a conventional broadcast receiver includes an expensive HDD, thereby raising manufacturing costs of the broadcast receiver. Moreover, since a manufacturer of such a broadcast receiver using a built-in HDD is responsible for HDD maintenance in the event of HDD malfunction, problems, such as inconvenience of an after-sales service and cost burden of an after-sales service, occur. Further, since the interior of the broadcast receiver is narrow, the broadcast receiver may lay insufficient space to mount the HDD therein. Furthermore, since the HDD is fixedly mounted within the broadcast receiver, a user cannot detach the HDD and cannot replace the HDD with another one without assistance from an after-sales service. Accordingly, it is difficult to increase the storage capacity of the HDD. In addition, a broadcast signal stored in the HDD mounted in the broadcast receiver can be played only through the corresponding broadcast receiver and transporting the HDD is not easy.

Although such a broadcast receiver having a storage device mounted therein for a digital video recording function is convenient in terms of a storage function, costs are high and the above-described disadvantages occur.

Even if a remote storage device is used to solve those problems, searching the remote storage device whenever the broadcast receiver is used is time consuming.

SUMMARY OF THE INVENTION

Accordingly, the present invention is directed to a broadcast signal processing system and a method for searching a storage device thereof that substantially obviates one or more problems due to limitations and disadvantages of the related art.

An object of the present invention is to provide a broadcast signal processing system which has a storage function and can be conveniently used, and a method for searching a storage device thereof.

Another object of the present invention is to provide a broadcast signal processing system which can conveniently perform a storage function even if a remote storage used is used, and a method for searching a storage device thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, a broadcast signal processing system including a storage device includes a receiving unit configured to receive a broadcast signal, a decoding unit configured to decode the broadcast signal received by the receiver, a display unit configured to display broadcast content according to the broadcast signal decoded by the decoder, an interface unit configured to communicate with the storage device through a wired network or a wireless network, and a control unit configured to control access to the storage device through the interface unit using one of connection information as to the storage device connected by the interface unit and search information as to the storage device searched through the network by the interface unit, and to control storage of the broadcast signal decoded by the decoder in the storage device or playback of content stored in the storage device by the display unit.

One of the connection information and search information includes at least one of address information of the storage device, a name of the storage device on a network, and a folder name within the storage device.

In another aspect, a broadcast signal processing system is provided. The broadcast signal processing system including a storage device, the broadcast signal processing system includes a receiving unit configured to receive a broadcast signal, a decoding unit configured to decode the broadcast signal received by the receiver, a display unit configured to display broadcast content according to the broadcast signal decoded by the decoder, an interface unit configured to communicate with the storage device through a wired network or a wireless network, a first control unit configured to control connection to the storage device through the interface unit using a protocol for searching the storage device when the storage device is connected to the network and a second control unit configured to control storage of the broadcasting signal decoded by the decoding unit or playback of content stored in the storage device by the display unit, when the storage device is connected to the network according to control of the first control unit.

The second control unit may control storage of the broadcast signal in a shared file system of the storage device or playback of broadcast content stored in the shared file system, when the storage device is searched. The first control unit may control display of a name of the storage device on the network, when the storage device is searched by an application according to the protocol for searching the storage device.

In another aspect, methods for searching a remote storage device are provided. A first method includes providing connection information as to previous connection to the storage device, receiving a signal for selecting the connection information from a user, and accessing the storage device according to the connection information, and storing a broadcast signal in the storage device or playing content stored in the storage device when the remote storage device is connected.

A second method includes providing search information including a result of searching storage devices previously connected to a network, receiving a selection signal for selecting search information as to a storage device in the search information from a user and accessing the storage device according to the search information, and storing a broadcast signal in the storage device or playing content stored in the storage device when the remote storage device is connected.

A third method includes providing a search result for the storage device through a wired or wireless network, receiving a selection signal for the storage device from a user, and accessing the storage device according to the selection signal, and storing a broadcast signal in the storage device or playing content stored in the storage device when the storage device is connected.

The search result for the storage device may include a name of the storage device on the network. The providing of the search result for the storage device is obtained by driving a network basic input/output system (NetBIOS). The search result for the storage device may include content of a shared folder of the storage device. The search result for the storage device may include a result using to a common Internet file system (CIFS).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
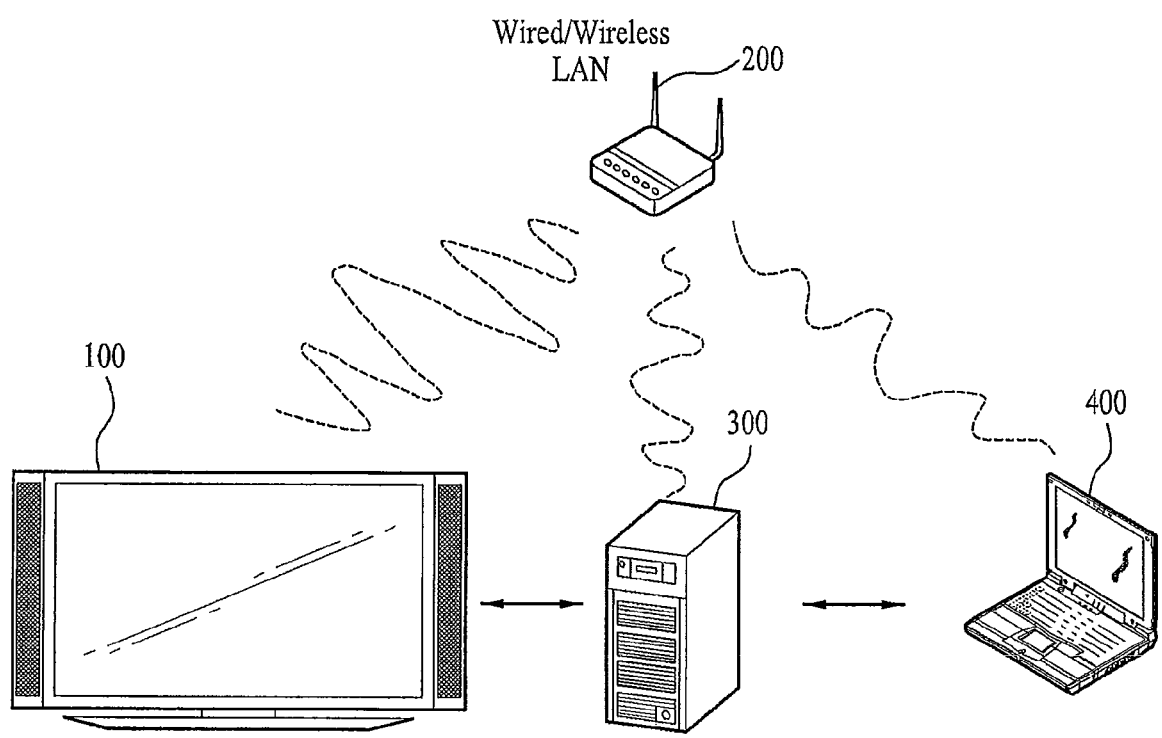
FIG. 1 is a conceptual diagram of a broadcast signal processing system in which a broadcast signal receiver is connected to an external storage device.

Reference will now be made in detail to the preferred embodiments of the present invention, examples of which are illustrated in the accompanying drawings. Wherever possible, the same reference numbers will be used throughout the drawings to refer to the same or like parts.

A broadcast signal processing system may include a broadcast signal receiver for storing broadcast signals in an external storage device and playing content stored in the external storage device and may include the storage device. Various external devices, for example, a computer, a printer, a cellular phone, etc. may be connected to the broadcast signal receiver. When receiving broadcast signals transmitted via terrestrial, satellite, or cable, the broadcast signal receiver can process the received broadcast signals and can display the processed broadcast signals on a screen. In addition, the broadcast signal receiver can process broadcast signals received through an Internet network and can display the processed broadcast signals on the screen. The broadcast signal receiver described herein may be applied to any one which can receive broadcast signals.

The broadcast signal receiver may be connected to an external storage device through wired or wireless connection or may be connected to a portable storage device through a port, without mounting a storage device for recoding/storing broadcast signals therein. Hereinafter, the storage device refers to a storage device which makes broadcast signals and broadcast content record and play, and a buffer for processing data and a storage device for loading a program in a processor are not included in the concept of the storage device which will be described hereinafter.

The storage device may be an optical recording medium which can write or read data using light, a magnetic recording medium which can write or read data using magnetism, and a nonvolatile memory which can write or read data using a semiconductor chip. In addition to the above-mentioned storage media, the storage device may include various kinds of media. The optical recording medium may include a digital versatile disc-rewritable (DVD-RW) and a compact disc-rewritable (CD-RW) and the magnetic recording medium may include a magnetic tape and an HDD. The storage device may further include a compact flash (CF) card, a smart card, a portable memory stick, a multimedia card, a secure digital (SD) card, a universal serial bus (USB) memory, etc. The storage device may use a display type storage medium, such as a personal multimedia player (PMP), a personal digital assistant (PDA), a cellular phone, or a smart phone, which can provide broadcast signals to a user, as well as a simple storage medium.

A broadcast signal receiver having a storage device therein is expensive and the internal storage device cannot be used for other purposes. The following example may be identically applied to a broadcast signal receiver which includes a storage device, a storage capacity of which is insufficient to store lots of broadcast signals. However, a description will be made of an embodiment of a broadcast signal receiver which does not include a storage device therein.

Accordingly, the following exemplary embodiment describes an example of a broadcast signal receiver which does not include a nonvolatile storage device for storing broadcast signals and stores the broadcast signals using an external storage device or plays the broadcast signals stored in the external storage device. The external storage device may communicate with the broadcast signal receiver using a wired or wireless remote network.

FIG. 1 is a conceptual diagram of a broadcast signal processing system in which a broadcast signal receiver is connected to an external storage device. Referring to FIG. 1, a first broadcast signal receiver 100 may communicate with a remotely located storage device 300. In FIG. 1, the first broadcast signal receiver 100 may be a digital TV by way of example.

A network device 200 may perform a relay function so that the first broadcast signal receiver 100 can communicate with the remote storage device 300. The storage device 300 provides broadcast content stored therein through a second broadcast signal receiver 400 and the network device 200. In FIG. 1, the second broadcast signal receiver 400 may be a notebook computer by way of example.

The broadcast signal receivers 100 and 400 can process digital content stored in an external storage device 300 using a network irrespective of whether they include a storage device therein.

Figure 4:
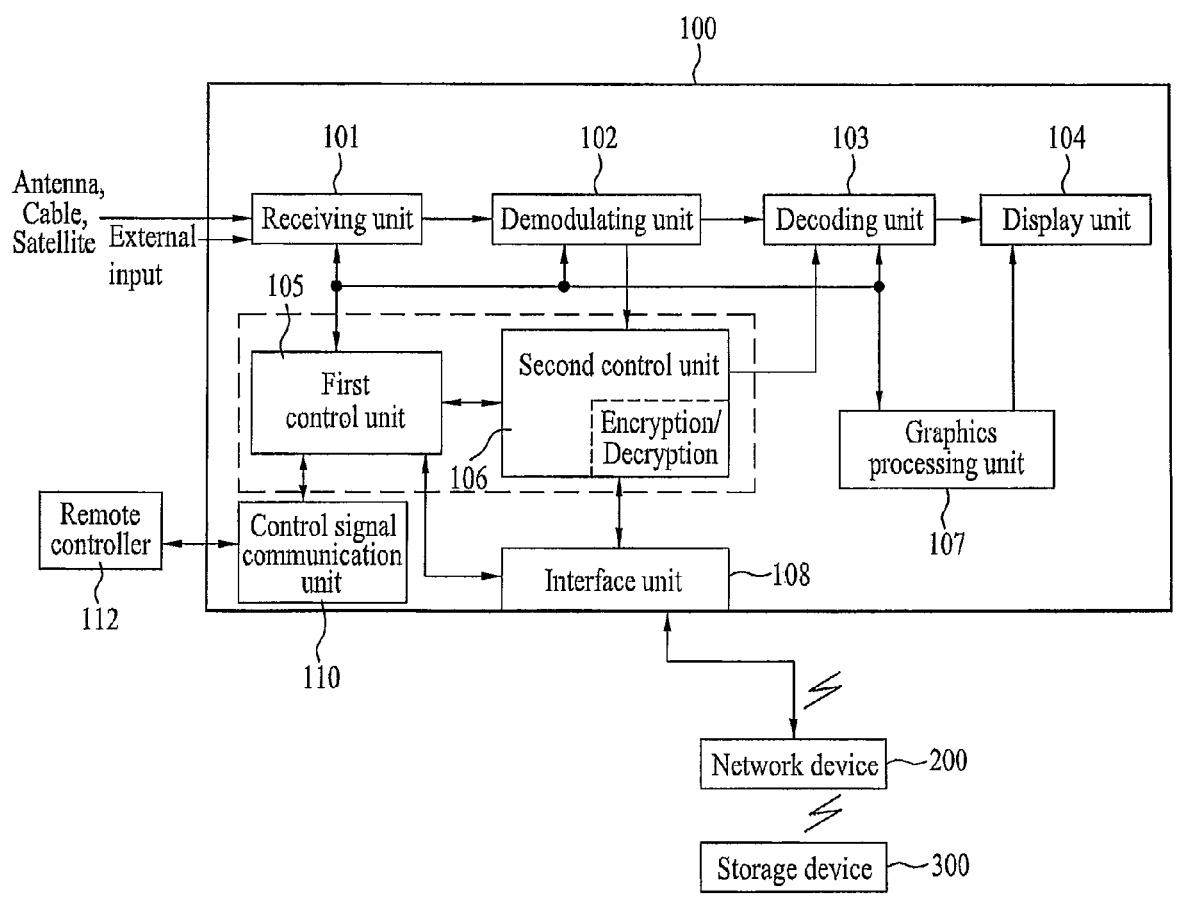
FIG. 4 is a block diagram illustrating an exemplary embodiment of a broadcast signal processing system.

If the broadcast signal receivers 100 and 400 are mobile or the storage device 300 is changed, the broadcast signal receivers 100 and 400 can search the storage device 300 through the network device 200. In this case, inconvenience may arise because it may take time for the broadcast signal receivers 100 and 400 to search the storage device 300. A detailed example of the broadcast signal processing system of FIG. 1 is illustrated in FIG. 4.

Figure 2:
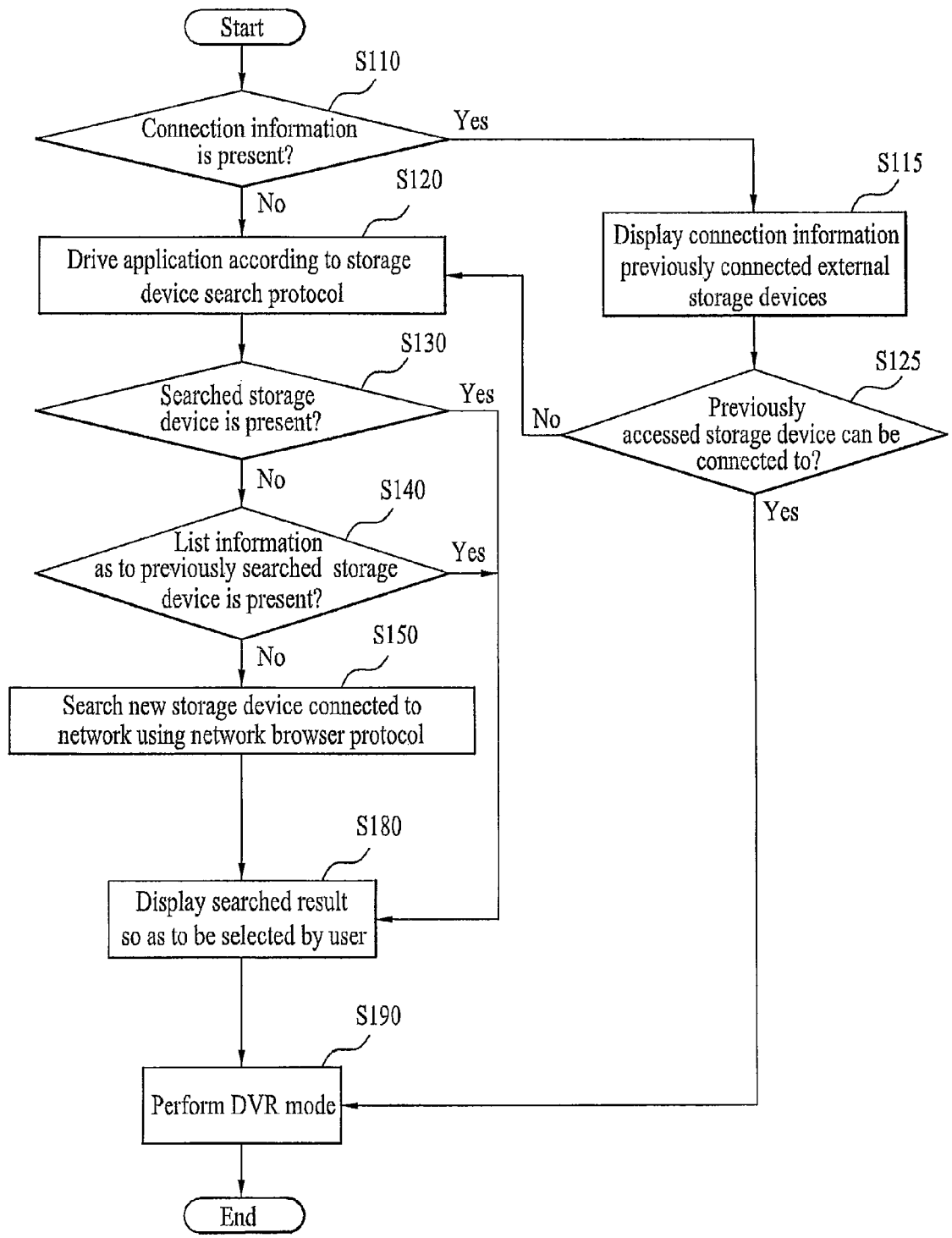
FIG. 2 is a flow chart illustrating a method for searching a storage device of a broadcast signal processing system according to an exemplary embodiment of the present invention.

FIG. 2 is a flow chart illustrating a method for searching a storage device of a broadcast signal processing system according to an embodiment of the present invention.

If a user wishes to connect a broadcast signal receiver to an external storage device, a broadcast signal receiver confirms whether connection information as to previously connected external storage devices is present in step S110. The connection information may include address information of the external storage devices, names of the external storage devices on a network, folder names of the external storage devices, and the like.

If the connection information as to the previously connected external storage devices is present in step S110, the broadcast signal receiver displays the connection information as to the previously connected external storage devices in step S115. If a user selects one of the external storage devices from the displayed information, the broadcast signal receiver may attempt connection to the selected storage device in step S125.

If the broadcast signal receiver can be connected to the previously accessed storage device in step S125, the broadcast signal receiver can access a specific folder of the searched storage device using a path included in the connection information as to the previously connected storage devices through selection by a user.

Therefore, the broadcast signal receiver may play broadcast signals stored in the connected storage device or may store processed broadcast signals in the connected storage device in step S190. Namely, the broadcast signal receiver may perform a record/play function of broadcast signals using a storage device connected externally through a network.

If the connection information as to the previously connected storage device is not present in step S110, the broadcast signal receiver confirms whether an accessible external storage device through a currently accessible network is present according to a search protocol in step S120.

In this case, the external storage device may be searched by adding names to storage devices connected to the network and implementing communication based on the added names. For example, the storage device connected to the network may be searched using a network basic input/output system (NetBIOS). NetBIOS is a protocol which can connect a network/transfer layer protocol in a session layer. Communication between applications of separate hosts can be performed using NetBIOS. The broadcast signal receiver searches an address of the storage device connected to the network using a protocol such as NetBIOS. The broadcast signal receiver can obtain a host name of a currently accessible storage device and can obtain a folder which can be commonly shared with the host.

If a storage device is found as a result of searching of step S120 in step S130, and if a user selects any one found storage device in step S180, the broadcast signal receiver may be connected to a remote storage device and may store broadcast content stored in the storage device or play the stored broadcast content in step S190.

Meanwhile, if a storage device is not found as a result of searching of step S120 in step S130, the broadcast signal receiver judges whether list information as to a previously searched storage device is present in step S140. List information as to the previously connected storage device may be provided to a user according to a result of step S110. In step S140, although the previously connected storage device is not present, the list information of the previously searched storage device may be provided to a user.

Although the previously connected storage device is not present, any one of the searched storage devices is searched in step S140, the broadcast signal receiver displays the searched result so that a user may select the storage device according to the displayed result in step S180. Then the broadcast signal receiver may be connected to a remote storage device and may store broadcast content in the storage device or may play the stored broadcast content in step S190.

If the previously searched storage device is not connected, the broadcast signal receiver searches a new storage device connected to a network using a network browser protocol in step S150. For example, the broadcast signal receiver may search and access a distributed storage device using a shared file system such as a common Internet file system (CIFS) among browser protocols for determining whether a storage device can be shared, and may share files of the storage device. Such a file system may request a remote server connected to a network of the stored file or may transmit a message to a program. The remote server may respond to the request.

When such a file system is used, a file stored in a remote storage device can be stored and used like a local file of the broadcast signal processing system. Accordingly, the broadcast signal receiver can search a remote storage device using a protocol for searching a remote file system.

If a storage device searched in the remote file system is present, the searched result is displayed and a user may select a specific storage device from the searched result in step S180. A detailed example of selecting the searched storage device or a folder of the searched storage device in step S180 is illustrated in detail in FIG. 3.

Thus, the broadcast signal receiver is connected to the remote storage device through the network and can store or play broadcast content stored in the storage device in step S190. An example of performing a function of a video/audio recorder by the broadcast signal receiver connected to the storage device is illustrated in detail in FIG. 5.

Meanwhile, the steps illustrated for connection of the broadcast signal receiver to the storage device may be separately performed. That is, for rapid connection of the broadcast signal receiver to the storage device, the respective steps for obtaining the connection information and search information for the storage device may be independently performed or may be performed sequentially. For example, step S140 may be provided together with step S110 or their order may be changed.

The broadcast signal receiver may automatically search external storage devices based on the connection information as to previously connected storage devices or the list information as to previously searched storage devices and may display only connectable lists. In addition, after a user selects the storage device in step S180, a verification process between the broadcast signal receiver and the storage device may be performed for connection therebetween. After the verification process, the broadcast signal receiver may perform the DVR function for the storage device.

Figure 3:
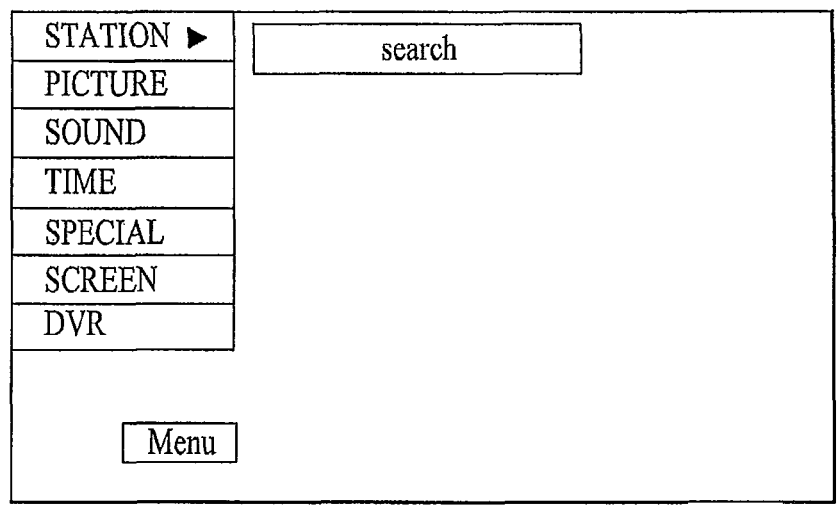
FIG. 3 represents diagrams illustrating a menu screen of a broadcast signal receiver, which shows a result of searching a remote storage device or a folder of the storage device.
Figure 3:
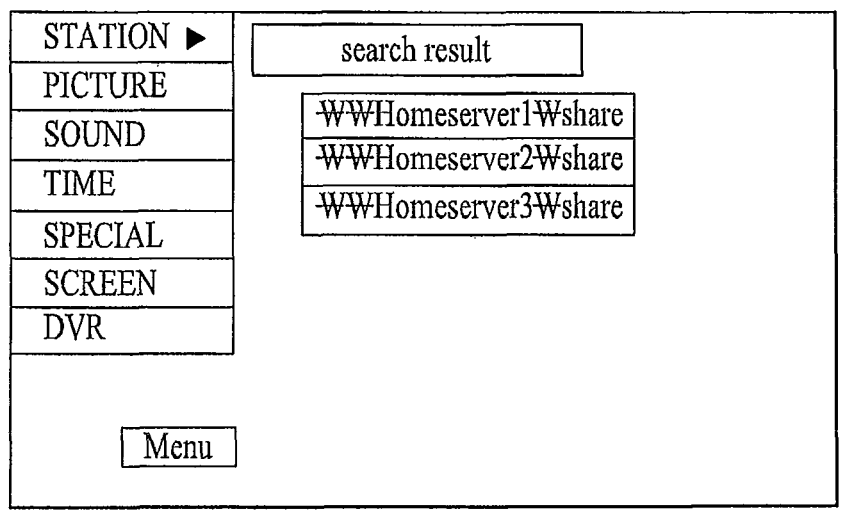

FIG. 3 represents diagrams illustrating a menu screen of a broadcast signal receiver, which shows a result of searching a remote storage device or a folder of the storage device. In FIG. 3, the broadcast signal receiver drives an application which can search and select a remote storage device. The application can provide a menu to a user so as to display and select the remote storage device.

A user selects a menu capable of searching a remote storage device from a menu displayed by the broadcast signal receiver. If a user selects a [station] menu in FIG. 3(a), the broadcast signal receiver displays a [search] menu so that the user can select the remote storage device. An initial screen of the [search] menu may display list information as to previously connected storage devices. Alternatively, the initial screen of the [search] menu may display list information as to previously searched storage devices which were not connected previously or list information as to the previously searched storage devices irrespective of whether storage devices were previously connected.

A user may select any one storage device from the list information so that the broadcast signal receiver can be connected to a shared folder of the selected storage device.

Meanwhile, no list information as to the previously searched or connected storage devices is present on the initial screen of the [search] menu, a user may search storage devices which are connected or operated on a network in the [search] menu. For example, if the [search] menu is selected, the broadcast signal receiver may drive a storage device search application according to a protocol such as NetBIOS and may display, as a list, information as to names of the storage devices connected on the network according to the driving result. In this case, a user may select a desired storage device and may search a shared folder of the storage device to be used as the storage device.

Meanwhile, if a user selects the [search] menu, the broadcast signal receiver may search a shared folder system, which can be connected on a network, from a remote file system. For example, if a user selects the [search] menu, the broadcast signal receiver may drive a file system using a protocol such as CIFS and may display, as a list, whether a file system of a shared server is present.

FIG. 3(b) illustrates an example of a result of searching a shared file system by selection of a [search] menu by a user. In FIG. 3(b), if a user uses a specific file system as a storage device, a broadcast signal processing system can play content stored in a shared folder of a corresponding file system according to control of a user or can store broadcast content in a corresponding shared folder according to a function of the broadcast signal receiver. The broadcast signal receiver may display files stored by the storage device connected thereto as if the storage device were included in the broadcast signal receiver.

FIG. 4 is a block diagram illustrating an embodiment of a broadcast signal processing system. The exemplary embodiment of the broadcast signal processing will now be described with reference to FIG. 4.

The broadcast signal processing system of FIG. 4 may include a broadcast signal receiver 100 and a storage device 300.

The broadcast signal receiver 100 may include a receiving unit 101, a demodulating unit 102, a decoding unit 103, a display unit 104, a first control unit 105, a second control unit 106, a graphics processing unit 107, an interface unit 108, and a control signal communication unit 110. The interface unit 108 may communicate with a wired or wireless network device 200 and may be connected to a remote storage device 300 through the network device 200. The control signal communication unit 110 may receive a user control signal according to a user control device, for example, a remote controller 112 and may supply the received signal to a control unit. A user menu for searching and connecting storage devices through the remote controller 112 is shown in FIGS. 3, and 5 to 10.

In FIG. 4, although the first control unit 105 and the second control unit 106 of the controller (indicated by dotted lines) are separately provided for simplicity of description, the first and second control units 105 and 106 may be implemented by one system chip. At least one of the first and second control units 105 and 106 of the controller may perform an exemplary function in the form of hardware, firmware, middleware, software, or a combination thereof.

The receiving unit 101 shown in FIG. 4 may be a tuner which receives a broadcast signal of a specific frequency through at least one of a terrestrial, a satellite, a cable, and an Internet network. The receiving unit 101 may be individually equipped according to each broadcasting source, for example, in a terrestrial, a cable, a satellite, or a private broadcast or may be an integrated tuner. If the receiving unit 101 is a terrestrial broadcast tuner, the receiving unit 101 may include both at least one of a digital tuner and an analog tuner or may be an integrated digital/analog tuner.

The receiving unit 101 may receive an Internet protocol (IP) stream transmitted through wired/wireless communication. Upon receiving the IP stream, the receiving unit 101 may process transmitted and received packets according to an IP protocol for setting source and destination information. The receiving unit 101 may output a video/audio/data stream included in the received IP packet according to the IP protocol or may output, as the IP packet, a transport stream to be transmitted via a network according to the IP protocol. The receiving unit 101 is a constituent element for receiving an externally input image signal and may receive a video/audio signal in the form of IEEE 1394 or a stream in the form of a high definition multimedia interface (HDMI).

The demodulating unit 102 demodulates an input broadcast signal in a reverse form of a modulation scheme. The demodulating unit 102 demodulates a broadcast signal to generate a broadcast stream. If the receiving unit 101 receives an IP stream, the IP stream bypasses the demodulating unit 102 and is transmitted to the decoding unit 103.

The decoding unit 103, including an audio decoder and a video decoder, decodes the broadcast stream generated from the demodulating unit 102 or a stream reproduced through the second control unit 106, according to each decoding algorithm, and supplies the decoded stream to the display unit 104. A demultiplexer (not shown) for separating respective streams according to a corresponding identifier may be provided between the demodulating unit 102 and the decoding unit 103. The demultiplexer may divide the broadcast signal into an audio element stream (ES) and a video ES and may supply the audio ES and the video ES to the audio decoder and the video decoder of the decoding unit 103, respectively. If a plurality of programs are multiplexed in one channel, the demultiplexer may select only a broadcast signal of a program selected by a user and may divide the broadcast signal into a video ES and an audio ES. If the demodulated broadcast signal include a data stream or a system information stream, the demultiplexer may divide such a broadcast signal and may supply the divided streams to the respective decoders.

The graphics processing unit 107 processes graphics to be displayed so that a menu screen, etc. can be displayed on a video image displayed by the display unit 104.

The interface unit 108 may interface with the remote storage device 300 through a wired or wireless network. The interface unit 108 may be an ethernet module, a Bluetooth module, a local area wireless Internet module, a mobile Internet module, a home phone line networking alliance (HomePNA) module, an IEEE1394 module, a programmable logic control (PLC) module, a home radio frequency (RF) module, an infrared data association (IrDA) module, etc.

The second control unit 106 controls the broadcast signal receiver 100 to play content stored in the storage device 300 through the interface unit 108 or to store a broadcast signal processed by the broadcast signal receiver 100 in the storage device 300.

The second control unit 106 may read content stored in the storage device 300 and may supply the content to the decoding unit 103, according to a play request of a user. The content stored in the storage device 300 may be in the form of a compression coded stream. In this case, the decoding unit 103 decodes the compression coded stream by a decoding algorithm and supplies the decoded stream to the display unit 104.

The second control unit 106 may encrypt broadcast content that is input to the receiving unit 101 and output to the storage device 300 and may read and decrypt the broadcast signals encrypted by the storage device 300.

The first control unit 105 may control operations of the constituent elements (the receiving unit, demodulating unit, decoding unit, display unit, graphics processing unit, second control unit, and interface unit). The first control unit 105 may drive an application for displaying a menu receiving a control command of a user and for displaying various information or menus of the broadcast signal processing system.

For example, the first control unit 105 controls display of list information as to previously connected or searched storage devices. If a user selects specific list information from the list information, the first control unit 105 may control the interface unit 108 so that the user can communicate with the selected storage device using connection information of the selected storage device.

If the list information as to the previously connected or searched storage devices is not stored, the first control unit 105 drives an application according to a protocol such as a NetBIOS so as to search storage devices which can be connected on a network through the interface unit 108. If storage devices are newly searched, the first control unit 105 controls displaying of names of the searched storage devices. Then a user may direct the second control unit 106 to store or play content in or through a selected storage device.

Meanwhile, the first control unit 105 may search storage devices by driving a manager according to a browser protocol which determines whether a remote storage device can be shared and may control displaying if the searched storage devices. For example, the first control unit 105 searches remote storage device using a protocol such as CIFS and controls the display unit 104 to display the searched storage device and list information of a shared folder of the storage device.

The display unit 104 may display list information as to the previously connected or searched storage devices by the first control unit 105, list information as to names of storage devices which are newly searched by the first control unit 105, and list information of storage devices which are searched by the first controller 105 using a protocol for a file system.

A user selects a storage device from the list information displayed by the display unit 104. The first control unit 105 judges whether the storage device selected by the user is connected to the interface unit 108 or can be connected to the interface unit 108 and controls displaying of the judged result.

Hereinafter, the case where the broadcast signal receiver 100 is connected to the storage device 300 and can perform a function of storing content in the storage device 300 or playing the stored content will be referred to as a video recorder mode or a digital video recorder (DVR) mode. That is, even though the broadcast signal receiver does not include an internal storage device which can store content, the receiver can perform a DVR function through connection to an external storage device.

If the DVD mode is performed, the broadcast signal receiver 100 can store or play content using the storage device 300 as described above. Moreover, if the DVR mode is performed, the broadcast signal receiver 100 can perform various play functions using the remote storage device 300. For example, the broadcast signal receiver 100 can perform normal playback, fast forward, backward, slow playback, etc. with respect to content stored in the storage device 300. In addition, the broadcast signal receiver 100 can store content according to various functions. For example, a timeshift function causes the broadcast signal receiver 100 to store content for a prescribed time in the storage device 300 and to play the stored content. Since the content is temporarily stored in the storage device 300, the content is transmitted to the broadcast signal receiver 100 from the storage device 300 and is played and may be deleted from the storage device 300. Therefore, the broadcast signal receiver 100 can play, using the timeshift function, broadcast content stored in the storage device 300 at an interval of a prescribed time after receiving the content, even though the content is being received in a real broadcasting signal.

If the broadcast signal receiver 100 immediately records broadcast content in the storage device 300, the broadcast content may be stored in a semi-permanent storage device of the storage device 300.

Figure 5:
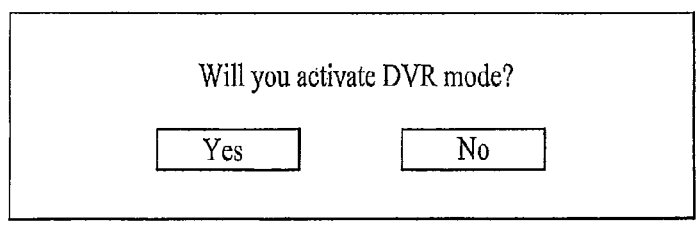
FIG. 5 is a diagram illustrating a menu screen for providing information as to a video recorder function when a broadcast signal receiver performs the video recorder function using a storage device.

FIG. 5 is a diagram illustrating a menu screen for providing information as to a video recorder function when a broadcast signal receiver performs the video recorder function using a storage device. If a broadcast signal processing system includes a storage device, and a broadcast signal receiver connected as illustrated in FIG. 2, the broadcast signal receiver can perform a DVR mode even though a storage device is not contained therein. If an interface unit communicates with the storage device through a network device, the first control unit can obtain, from the interface unit, information indicating that the DVR mode is performed.

In this case, the graphics processing unit of the broadcast signal receiver may inquire of a user whether to perform a DVR mode as shown in FIG. 5. If the DVD mode is desired, the user may select a 'Yes' key and may store content in a storage device or may play the stored content.

If the user selects a 'No' key, the broadcast signal receiver breaks connection to the storage device which is remotely connected thereto or maintains communication connection only to the storage device without transmitting and receiving files until the user re-performs the DVR mode.

If the broadcast signal processing system can perform the DVR mode, the broadcast signal receiver may activate a [DVR] menu for performing the DVR function in the menu screen shown in FIG. 3(*a*). A user may select the [DVR] menu for performing the DVR mode in the menu screen for selecting functions of the broadcast signal receiver. The broadcast signal receiver may then store received broadcast content using a connected storage device or may read the content stored in the storage device to play the content through the broadcast signal receiver.

Figure 6:
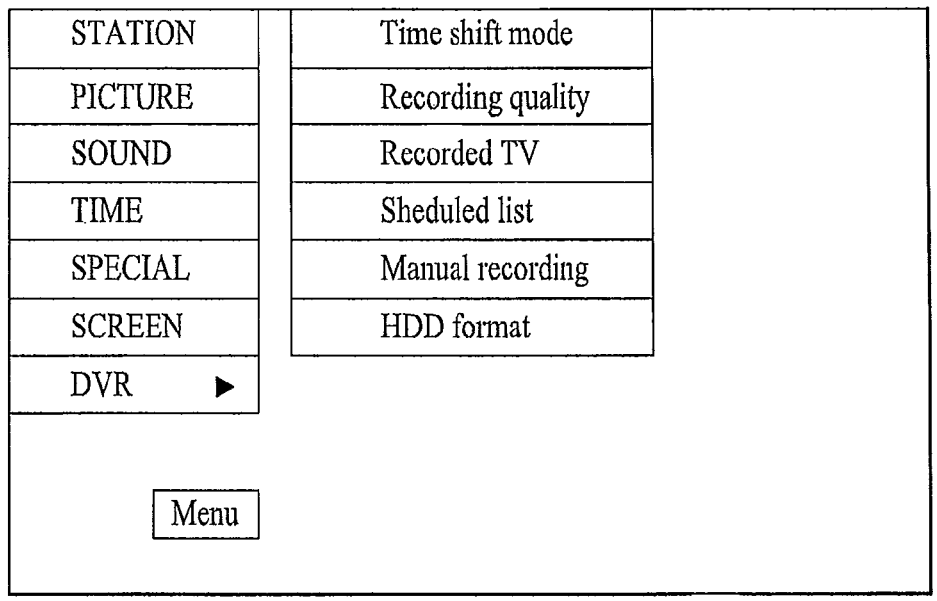
FIG. 6 is a diagram illustrating a menu for a DVR function when a DVR mode is performed.

FIGS. 6 to 10 illustrate menu screens according to a DVR function when a broadcast signal processing system can perform a DVR mode after a broadcast signal receiver is connected to a storage device as illustrated in FIG. 2 and FIG. 6 illustrates a menu for a DVR function when a DVR mode is performed.

A user may call menus for a DVR function using a user control device such as a remote controller, as illustrated in FIGS. 6 to 10 and may control a function of a specific menu item to be performed among displayed menu items.

If the DVR mode can be performed, menus are displayed so as to select a DVR menu. In FIG. 6, an example of displaying a Timeshift Mode sub-menu, a Recording Quality sub-menu, a Recorded TV sub-menu, a Scheduled List sub-menu, a Manual Recording sub-menu, and an HDD Format sub-menu is shown.

The Timeshift Mode sub-menu can set an automatic/manual timeshift mode in a storage device to which a broadcast signal receiver is connected according to the method illustrated in FIG. 2. The automatic/manual timeshift mode will be described in conjunction with FIG. 7.

The Recording Quality sub-menu can set recording quality for content stored in a storage device to which a broadcast signal receiver is connected according to the method illustrated in FIG. 2. The Recorded TV sub-menu refers to a recorded list of broadcast content stored in a storage device to which a broadcast signal receiver is connected according to the method illustrated in FIG. 2. The scheduled List sub-menu corresponds to a menu for displaying a scheduled recording list which is scheduled for recording through a storage device to which a broadcast signal receiver is connected according to the method illustrated in FIG. 2. The Scheduled List sub-menu may set scheduled recording broadcast, channel, date, start time, end time, etc.

The Manual Recording sub-menu sets details when performing recording through a storage device to which a broadcast signal receiver is connected according to the method illustrated in FIG. 2. For example, when a user performs scheduled recording through the Manual Recording sub-menu, a time or a program title may be selected. The HDD Format sub-menu indicates that a storage device to which a broadcast signal receiver is connected according to the method illustrated in FIG. 2 is an HDD and corresponds to a sub-menu for formatting the HDD.

Figure 7:
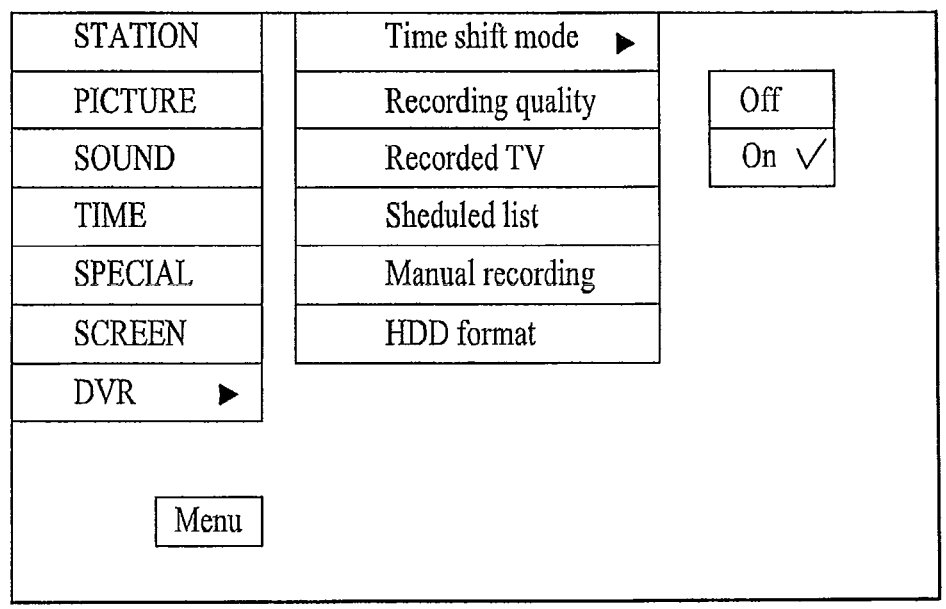
FIG. 7 is a diagram illustrating a function of a Timeshift Mode sub-menu in the menu shown in FIG. 6.

FIG. 7 is a diagram illustrating a function of a Timeshift Mode sub-menu in the menu shown in FIG. 6. A user may generate a signal for implementing a function of the Timeshift Mode sub-menu using a user control device. A user may set an automatic/manual timeshift mode through the Timeshift Mode sub-menu. If 'On' of the Timeshift Mode sub-menu is selected, an automatic timeshift mode may be performed. If 'Off' of the Timeshift mode sub-menu is selected, a manual timeshift mode may be performed.

In the automatic timeshift mode, a demodulated broadcast signal that is received in real-time is automatically stored in a timeshift storage region of the storage device 300 through the second control unit 106 and the interface unit 108.

In the manual timeshift mode, a timeshift function may not be performed or a user may select whether to perform the timeshift function through the menu.

In FIG. 7, 'On' is a menu item indicating that the automatic timeshift mode is performed. If the 'On' menu item is selected, broadcast content received by the broadcast signal receiver is searched or selected and is then temporarily stored in a specific folder of the storage device.

Figure 8:
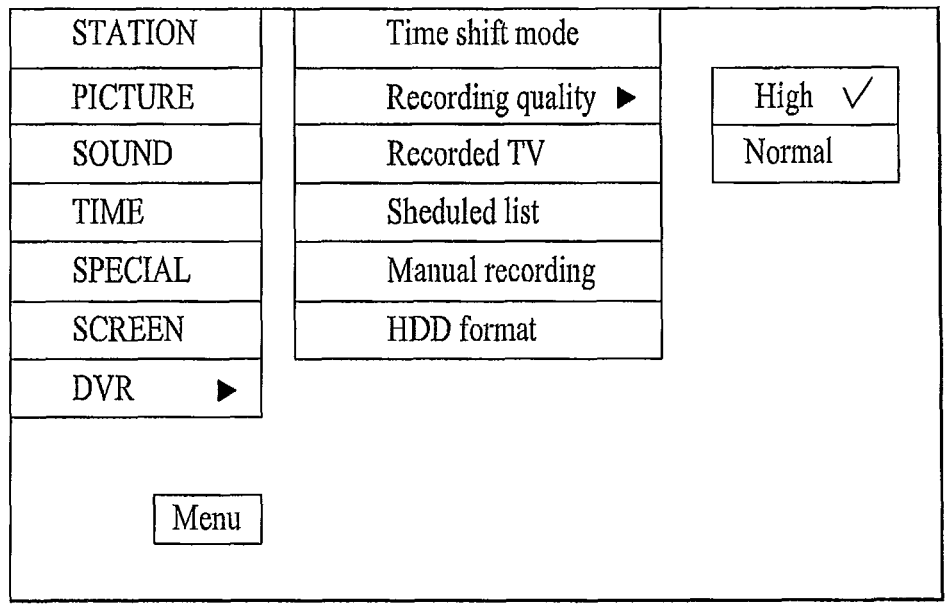
FIG. 8 is a diagram illustrating a function of a Recording Quality sub-menu in the menu shown in FIG. 6.

FIG. 8 is a diagram illustrating a function of a Recording Quality sub-menu in the menu shown in FIG. 6. A user may generate a signal for implementing a function of the Recording Quality sub-menu using a user control device.

A user may set recording quality through the Recording Quality sub-menu. For example, when recording analog broadcasts or externally input signals in a remote storage device, a user may select recording quality. In FIG. 8, 'High' indicates a menu item selected when content to be recorded is generated according to high resolution or sharpness, and 'Normal' indicates a menu item selected to record content according to general resolution or sharpness in a remote storage device. If the 'Normal' menu item is selected, even content having high resolution or sharpness is stored in a remote storage device with low recording quality.

Figure 9:
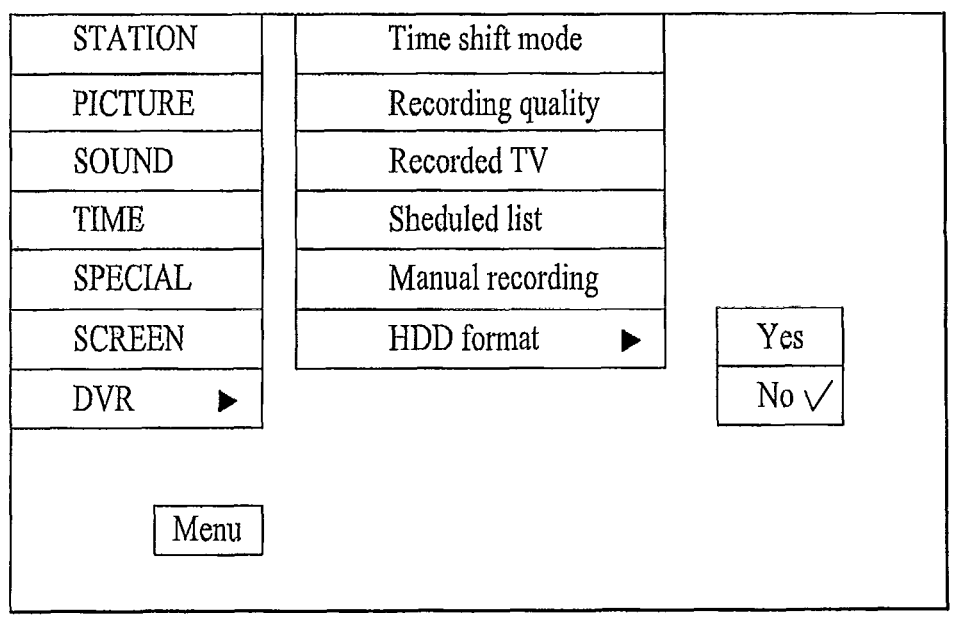
FIG. 9 is a diagram illustrating a function of an HDD Format sub-menu in the menu shown in FIG. 6.
Figure 10:
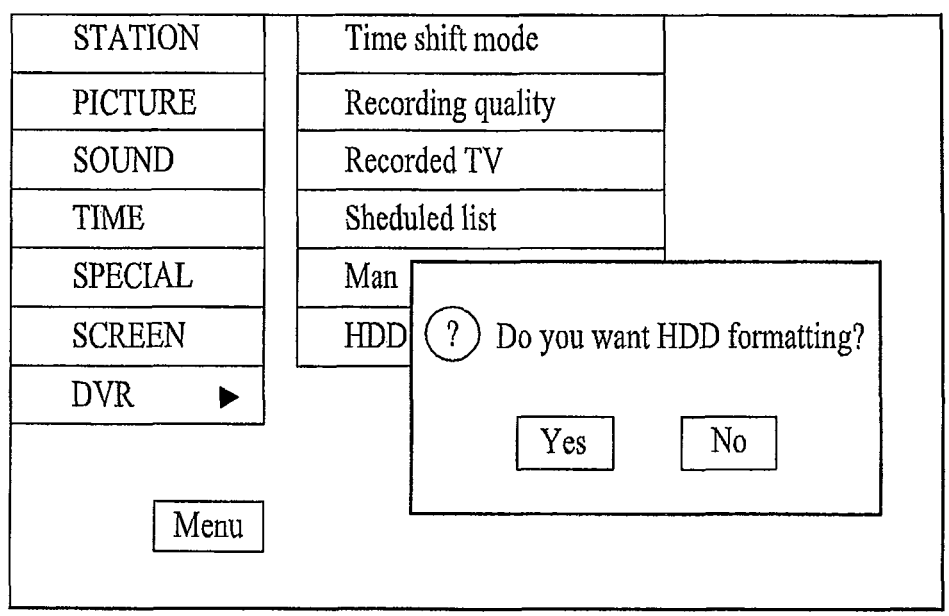
FIG. 10 shows an example of displaying a window asking a user whether to perform HDD formatting when a 'Yes' menu item shown in FIG. 9 is selected.

FIG. 9 is a diagram illustrating a function of an HDD Format sub-menu in the menu shown in FIG. 6. FIG. 9 shows that a storage device which is selected or searched according to the method illustrated in FIG. 2 is an HDD. A user may perform, using a user control device such as a remote controller, a format command for a storage device to which a broadcast signal receiver is remotely connected. If a user wishes to perform HDD formatting, a menu button corresponding to 'Yes' may be selected. FIG. 10 shows an example of displaying a window asking a user whether to perform HDD formatting when the 'Yes' menu item shown in FIG. 9 is selected.

Accordingly, the broadcast signal receiver having no storage device for storing broadcast signals can perform a command such as formatting with respect to a remote storage device and can re-confirm through a menu whether a user wishes to perform the command.

As described above, the broadcast signal receiver of the broadcast signal processing system can rapidly search an accessible storage device or a file system within the storage device, using information as to previously connected or searched remote storage devices.

The broadcast signal receiver can perform a DVR mode by rapidly accessing a remote storage device. The broadcast signal receiver can activate or generate a menu for the DVR mode when performing the DVR mode. Further, the broadcast signal receiver can store broadcast content in a remote storage device through a menu of the activated DVR mode or can display the stored content.

Consequently, even the broadcast signal receiver having no storage device can store and play a broadcast signal and can use a remote storage device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A broadcast signal processing system, the broadcast signal processing system comprising:

a receiving unit configured to receive a broadcast signal;
a decoding unit configured to decode the broadcast signal received by the receiving unit;
a display unit configured to display broadcast content according to the broadcast signal decoded by the decoding unit;
an interface unit configured to communicate with a storage device through a wired network or a wireless network; and
a control unit configured to control access to the storage device through the interface unit using connection information as to the storage device connected by the interface unit and to control storage of the broadcast signal decoded by the decoding unit in the storage device or playback of content stored in the storage device by the display unit,
wherein when a request for displaying a storage device currently connected with the broadcasting signal processing system is inputted through a user interface, the display unit displays the connection information for a previously connected storage device through the interface unit, and
wherein when the previously connected storage device is not currently connected based on the connection information, the control unit performs a search function, the search function searching a new storage device through the network by the interface unit using a network protocol, the new storage device being capable of currently connecting with the broadcasting signal processing system through the network by the interface unit, and then the display unit displays search information for the new storage device searched through the network by the interface unit.

2. The broadcast signal processing system according to claim 1, wherein one of the connection information and search information includes at least one of address information of the new storage device, a name of the new storage device on a network, and a folder name within the new storage device.

3. The broadcast signal processing system according to claim 1, wherein the control unit controls one of the connection information and the search information to be displayed as a list or controls the storage device according to information selected by a user.

4. A broadcast signal processing system, the broadcast signal processing system comprising:
a receiving unit configured to receive a broadcast signal;
a decoding unit configured to decode the broadcast signal received by the receiving unit;
a display unit configured to display broadcast content according to the broadcast signal decoded by the decoding unit;
an interface unit configured to communicate with a storage device through a wired network or a wireless network;
a first control unit configured to control connection to the storage device through the interface unit using a network protocol for searching the storage device when the storage device is connected to the network; and
a second control unit configured to control storage of the broadcast signal decoded by the decoding unit or playback of content stored in the storage device by the display unit, when the storage device is connected to the network according to control of the first control unit,
wherein when a request for displaying a storage device currently connected with the broadcasting signal processing system is inputted through a user interface, the display unit displays the connection information for a previously connected storage device through the interface unit, and
when the previously connected storage device is not currently connected based on the connection information, the first control unit performs a search function, the search function searching a new storage device through the network by the interface unit using a network protocol, the new storage device being capable of currently connecting with the broadcasting signal processing system through the network by the interface unit, and then the display unit displays the second control unit controls so that search information for the new storage device searched through the network by the interface unit.

5. The broadcast signal processing system according to claim 4, wherein the first control unit controls display of a name of the new storage device on the network, when the new storage device is searched by an application according to the network protocol for searching the new storage device.

6. The broadcast signal processing system according to claim 4, wherein the network protocol for searching the new storage device is a network basic input/output system (NetBIOS).

7. The broadcast signal processing system according to claim 4, wherein the network protocol for searching the new storage device is a common Internet file system (CIFS).

8. The broadcast signal processing system according to claim 7, wherein the second control unit controls storage of the broadcast signal in a shared file system of the storage device or playback of broadcast content stored in the shared file system, when the new storage device is searched.

9. A method for searching a storage device, the method comprising:
receiving, through a user interface, a request for displaying a storage device currently connected with a broadcasting signal processing system;
providing, on a display unit, the connection information for a previously connected storage device through the interface unit;
receiving, through the user interface, a selection signal for selecting a storage device as to previously connected storage devices in the provided connection information from a user;
performing a search function when a selected storage is not currently connected in accordance with the selection signal, the search function searching a new storage device through a network using a network protocol, the new storage device being capable of currently connecting with the broadcasting signal processing system through the network;
displaying, on the display unit, the search information for the new storage device searched through the network; and
accessing the new storage device according to the search function, and storing a broadcast signal in the new storage device or playing content stored in the new storage device when the new storage device is connected.

10. The method according to claim 9, wherein the connection information includes a name of the new storage device on the network.

11. The method according to claim 10, wherein the connection information is obtained by driving a network basic input/output system (NetBIOS).

12. The method according to claim 9, wherein the connection information includes content of a shared folder of the new storage device.

13. The method according to claim 12, wherein the connection information includes a result using to a common Internet file system (CIFS).

\* \* \* \* \*